(12) United States Patent
Goodsitt et al.

(10) Patent No.: US 10,854,048 B2
(45) Date of Patent: *Dec. 1, 2020

(54) CARD RECEPTACLE OF AN AUTOMATED TRANSACTION MACHINE

(71) Applicant: Capital One Services, LLC, McLean, VA (US)

(72) Inventors: Jeremy Edward Goodsitt, Champaign, IL (US); Austin Grant Walters, Savoy, IL (US); Fardin Abdi Taghi Abad, Champaign, IL (US); Vincent Pham, Champaign, IL (US); Anh Truong, Champaign, IL (US); Kenneth Taylor, Champaign, IL (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/574,176

(22) Filed: Sep. 18, 2019

(65) Prior Publication Data
US 2020/0152021 A1     May 14, 2020

Related U.S. Application Data

(63) Continuation of application No. 16/183,977, filed on Nov. 8, 2018, now Pat. No. 10,460,571.

(51) Int. Cl.
*G07F 7/08*     (2006.01)
*G07F 19/00*     (2006.01)
(Continued)

(52) U.S. Cl.
CPC ......... *G07F 19/205* (2013.01); *G06K 7/0004* (2013.01); *G07D 11/00* (2013.01); *G07F 7/08* (2013.01)

(58) Field of Classification Search
CPC .. G07F 19/2055; G07F 19/201; G07F 19/205; G07F 19/20; G07F 19/207; G07F 19/209; G07F 7/0873; G07F 7/08; G06Q 20/18; G06K 7/0004; G06K 7/0021; G06K 19/07741; G06K 7/0056; G06K 7/00; G06K 7/003; G06K 7/01; G06K 7/10366; G06K 7/0073; G06K 7/015; G06K 7/04;
(Continued)

(56) References Cited

U.S. PATENT DOCUMENTS

| | | | | |
|---|---|---|---|---|
| 3,956,615 | A | * | 5/1976 | Anderson ............... G07F 19/20 705/72 |
| 5,397,886 | A | * | 3/1995 | Mos ...................... G06K 7/0004 235/440 |
| 2004/0129772 | A1 | * | 7/2004 | Ramachandran ... G07F 19/2055 235/379 |

\* cited by examiner

*Primary Examiner* — Thien T Mai (57) ABSTRACT

Disclosed is an automated transaction machine (ATM) including a card receptacle of a user interface, the card receptacle having a wall extending adjacent a main surface of the user interface, and a support extending between the main surface and the wall. The support, the wall, and the main surface of the user interface define a cavity operable to receive a transaction card. The ATM may further include an exit device of the user interface, the exit device including a container for receiving the transaction card, and a door positioned adjacent the container. The door is biasable between a first position and a second position, wherein in the first position the door substantially covers an exit opening through the main surface of the user interface, and wherein in the second position the door permits access to the container through the exit opening.

19 Claims, 8 Drawing Sheets

(51) Int. Cl.
*G06K 7/00* (2006.01)
*G07D 11/00* (2019.01)

(58) Field of Classification Search
CPC .. G06K 7/0013; G06K 7/0026; G06K 7/0034;
G06K 7/0043; G06K 7/0052; G06K
7/0069; G06K 7/10009; G06K 7/10128;
G06K 7/10297; G06K 7/10386; G06K
7/109
See application file for complete search history.

CARD RECEPTACLE OF AN AUTOMATED TRANSACTION MACHINE

CROSS-REFERENCE TO RELATED APPLICATION

This is a continuation of pending U.S. Non-provisional patent application Ser. No. 16/183,977, filed Nov. 8, 2018, titled "CARD RECEPTACLE OF AN AUTOMATED TRANSACTION MACHINE," the entire contents of which is incorporated herein by reference.

FIELD

Embodiments of the present disclosure relate to automated transaction machines and, more particularly, to card receptacle systems of automated transaction machines.

BACKGROUND

Credit cards, debit cards, gift cards, membership cards, loyalty cards, promotional cards, identification cards, etc., all of which are generally known as transaction cards, are commonly used today. Transaction cards include information for carrying out one or more specified transactions. The information is typically carried upon or within the boundaries of the card on a transaction information medium, such as a magnetic stripe, a bar code, optical storage, a computer chip, a smart chip, or the like.

Transaction card readers are required in a large number of situations, such as when paying for fuel at a fuel dispenser, an Automated Teller Machine (ATM), or in a retail setting. A card reader allows a customer to pay more efficiently without having to hand a credit card over to an employee or, in some situations like at a fuel dispenser or an ATM, even interact with an employee. Card readers can be manual or motorized. Manual card readers require the user to insert a transaction card into the card reader and then pull it back out. A motorized card reader accepts a credit card into a card slot from a user, and the reader may have rubber wheels for drawing the card inside. The user thus has control over the transaction card when using a manual card reader, and the card reader itself has control over the transaction card when a user is interacting with a motorized card reader. Often a motorized card reader is secured so it will not be possible to access the components of the reader without breaking a tamper switch. This extra security helps to protect transaction cards used in the motorized card reader, but a motorized card reader is often more difficult and expensive to maintain because of the increased complexity of the reader. A manual card reader is often less expensive to maintain because of the lack of any motorized components to accept the card. Moreover, a user will always have physical control of the card thus preventing the risk of the card becoming stuck in the reader.

One drawback with both manual and automatic card readers is susceptibility to "skimming." As card readers often have a single slot for use by both a magnetic stripe and a chip, once a card is passed through the magnetic stripe reader, the card is susceptible to being skimmed. One type of skimmers includes a small device attached to the slot for scanning and storing transaction card data from the magnetic stripe. Thieves can use the stored transaction data to make fraudulent charges either online or with a counterfeit credit card.

Accordingly, there remains a need for methods and devices for preventing skimming of transaction cards in a card reader.

SUMMARY

This Summary is provided to introduce a selection of concepts in a simplified form that are further described below in the Detailed Description. This Summary is not intended to identify key features or essential features of the claimed subject matter, nor is it intended as an aid in determining the scope of the claimed subject matter.

In some embodiments, an automated transaction machine (ATM), may include a card receptacle of a user interface. The card receptacle may include a wall extending adjacent a main surface of the user interface, and a support extending between the main surface and the wall, wherein the support, the wall, and the main surface of the user interface define a cavity operable to receive a transaction card. The card receptacle may further include an exit device of the user interface, the exit device a container for receiving the transaction card, and a door positioned adjacent the container, the door biasable between a first position and a second position, wherein in the first position the door substantially covers an exit opening through the main surface of the user interface, and wherein in the second position the door permits access to the container through the exit opening.

In some embodiments, a system may include a card receptacle of a user interface, the card receptacle including a wall extending parallel to a main surface of the user interface, and a support extending between the main surface and the wall. The support, the wall, and the main surface of the user interface may define a cavity operable to receive a transaction card. The card receptacle may further include a card reader proximate the card receptacle, and an exit device operable to receive the transaction card after the transaction card is processed by the card reader. The exit device may include a container for receiving the transaction card, and a door positioned adjacent the container. The door is biasable between a first position and a second position, wherein in the first position the door substantially covers an exit opening through the main surface of the user interface, and wherein in the second position the door permits access to the container through the exit opening.

In some embodiments, a method may include providing an automated transaction machine including a body and a user interface, and receiving a transaction card within a cavity of a card receptacle of the user interface. The card receptacle may include a wall extending adjacent to a main surface of the user interface, and a support extending from the main surface towards the wall, wherein the support, the wall, and the main surface of the user interface define the cavity. The method may further include processing the transaction card by a card reader positioned within the body, and receiving the transaction card at an exit device after the transaction card is processed by the card reader. The exit device may include a container for collecting the transaction card, and a door positioned adjacent the container, the door biasable between a first position and a second position, wherein in the first position the door substantially covers an exit opening through the main surface of the user interface, and wherein in the second position the door permits access to the container through the exit opening.

BRIEF DESCRIPTION OF THE DRAWINGS

The accompanying drawings illustrate example approaches of the disclosure, including the practical application of the principles thereof, as follows.

The drawings are not necessarily to scale. The drawings are merely representations, not intended to portray specific parameters of the disclosure. The drawings are intended to depict example embodiments of the disclosure, and therefore are not be considered as limiting in scope. In the drawings, like numbering represents like elements.

Furthermore, certain elements in some of the figures may be omitted, or illustrated not-to-scale, for illustrative clarity. The cross-sectional views may be in the form of "slices", or "near-sighted" cross-sectional views, omitting certain background lines otherwise visible in a "true" cross-sectional view, for illustrative clarity. Furthermore, some reference numbers may be omitted in certain drawings.

DETAILED DESCRIPTION

The present embodiments will now be described more fully hereinafter with reference to the accompanying drawings, where some embodiments are shown. The subject matter of the present disclosure may be embodied in many different forms and are not to be construed as limited to the embodiments set forth herein. These embodiments are provided so this disclosure will be thorough and complete, and will fully convey the scope of the subject matter to those skilled in the art. In the drawings, like numbers refer to like elements throughout.

Embodiments herein are directed to ATMs and methods including transaction card receptacles and exit devices designed to avoid skimming devices currently in use. Specifically, the card receptacles and exit devices do not offer an opportunity for skimming devices to be physically attached thereto. In some embodiments, the ATM may include a card receptacle of a user interface, wherein the card receptacle includes a wall extending parallel to a main surface of the user interface, and a support extending between the main surface and the wall. The support, the wall, and the main surface of the user interface may define a cavity operable to receive a transaction card. The ATM further includes an exit device of the user interface, the exit device including a container for receiving the transaction card, and a door positioned adjacent the container. The door may be biasable between a first position and a second position, wherein in the first position the door substantially covers an exit opening through the main surface of the user interface, and wherein in the second position the door permits access to the container through the exit opening. Because the card receptacle and exit device of the present disclosure do not force the transaction therethrough, the possibility of the transaction card being read by a skimmer is reduced.

Figure 1:
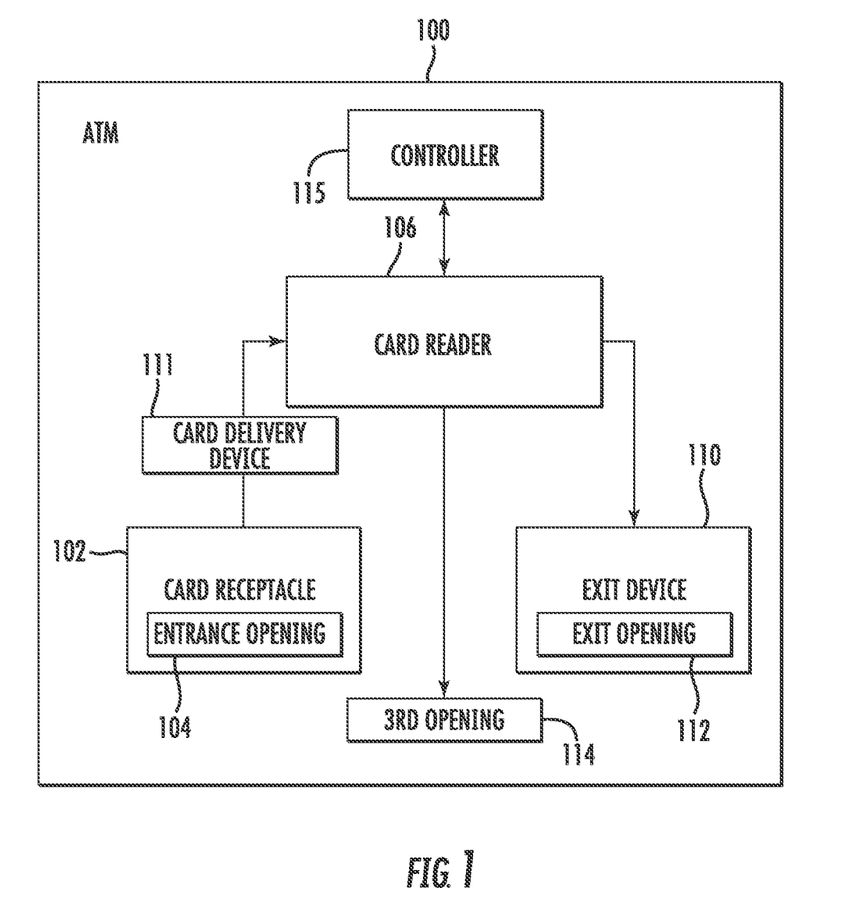
FIG. 1 is a block diagram of an automated transaction machine (ATM), in accordance with embodiments of the present disclosure.

Referring now to FIG. 1, an example automated transaction machine (ATM) 100 according to embodiments of the disclosure will be described. The ATM 100 may include a card receptacle (hereinafter "receptacle") 102 including an entrance opening 104 into an internal area of the ATM 100. The receptacle 102 may be operable with a card reader 106 positioned within a body of the ATM 100, and with an exit device 110 including an exit opening 112 for discharging a transaction card (e.g., credit card or debit card) from the ATM 100. The card reader 106 may receive the transaction card via a card delivery device 111, which may be a linear transport mechanism including a stretchable endless belt and one or more rollers. The card reader 106 is operable to read data bearing records presented by users of the ATM 100. Such records can include data corresponding to at least one of the associated user, one or more user financial accounts, and/or other data. In some example embodiments, the card reader 106 may read the data from magnetic stripe cards. In other example embodiments, the card reader 106 may be operative to read data from other card or record types such as contactless cards. As further shown, the ATM 100 may include a third opening 114, such as an opening for dispensing currency to a user of the ATM 100 in response to a transaction.

The ATM 100 may further include one or more controllers 115, which are alternatively referred to herein as computers. Such internal computers include one or more processors. Such processors may be in operative connection with one or more data stores. In some embodiments, processors may be located on certain devices within the ATM 100 so as to individually control the operation thereof. Alternatively, in other embodiments, the controller 115 associated with the ATM 100 may operate in a remote server which is remotely located from the machine. Such a remote server may operate a virtual machine and control the components of the ATM 100. For purposes of simplicity, an example embodiment will be described as having a single controller which controls the operation of devices within the ATM 100.

Although not shown, the controller 115 may be in operative connection with one or more data stores. Such data stores in an example embodiment are operative to store program instructions, values, and other information used in the operation of the ATM 100. In order to conduct transactions, the ATM 100 may communicate with one or more remote computers. The remote computers are operative to exchange messages with the ATM 100 and authorize and record the occurrence of various transactions. For example, the ATM 100 may communicate through a network with a bank, which has at least one computer operable to exchange messages with the ATM 100 through a network. It will be appreciated that the ATM 100 is simplified as shown in FIG. 1, and that additional features and components of the ATM 100 are not shown for ease of explanation and for the sake of brevity.

Figure 2A:
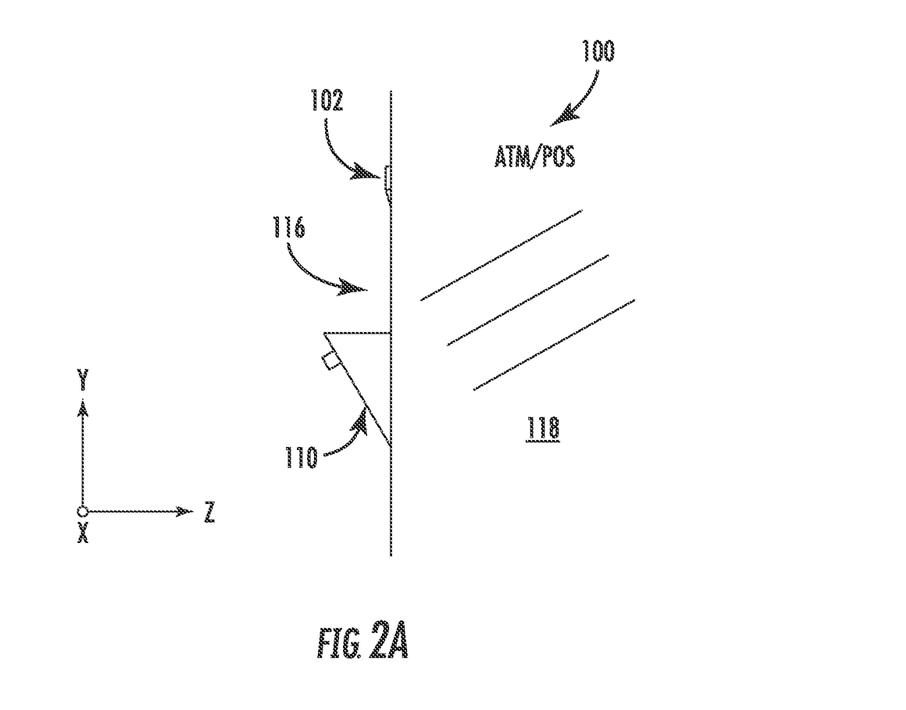
FIG. 2A is a side view of a card receptacle and an exit device of the ATM of FIG. 1, in accordance with embodiments of the present disclosure.
Figure 2B:
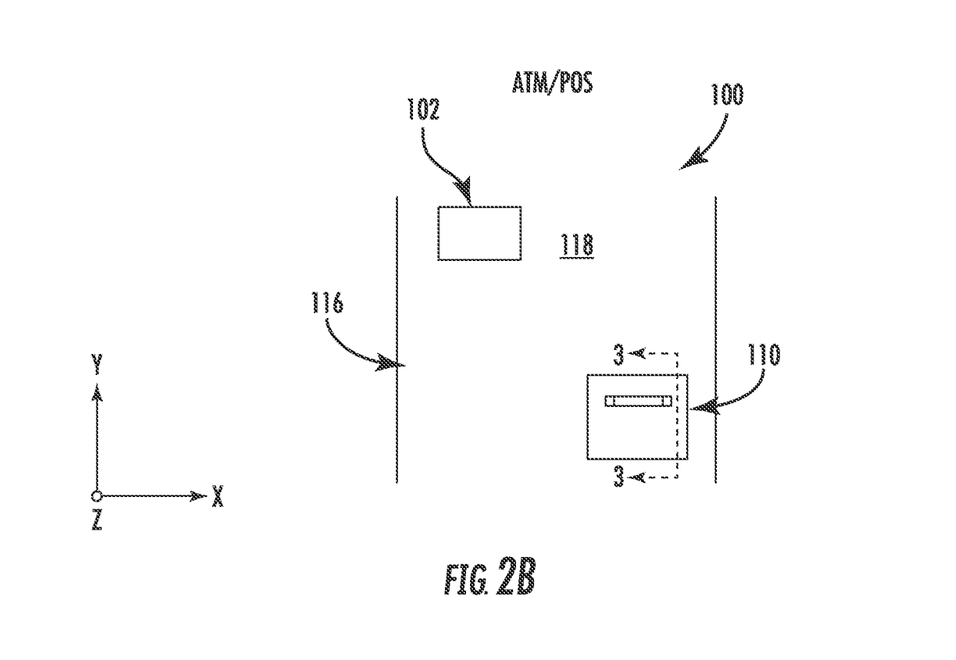
FIG. 2B is a front view of the card receptacle and the exit device of the ATM of FIG. 2A, in accordance with embodiments of the present disclosure.

FIGS. 2A-2B demonstrate the receptacle 102 and the exit device 110 of the ATM 100 in greater detail. As shown, the receptacle 102 and the exit device 110 may be part of a user interface 116. The user interface 116 may extend along, or make up a portion, of a body 118 of the ATM 100. Although not shown, the user interface 116 can also include one or more input devices, such as function keys and a keypad. The example user interface 116 may also include one or more cameras, which may serve as an input device for biometric features and the like. The example user interface 116 may also include output devices such as a display, which is viewable by an operator of the machine. Further output devices in the example user interface 116 may include a receipt delivery slot, which is operative to provide users of the machine with receipts for transactions conducted.

The user interface 116 may include other devices, such as a biometric reader. A biometric reader can read user biometric data. For example, user biometric information may involve one or more of a fingerprint, thumbprint, hand scan (e.g., palm print or back of hand), iris scan, retina scan, fingernail print, spoken password, voice print, voice (speech) recognition, image data, face topography data, facial recognition, DNA scan, etc., or combinations thereof. Read biometric data (or indicia) can be used for purposes of identifying a particular user and/or their account. For example, biometric data can be used to verify that a person is authorized to use a cash dispensing automated banking machine. Read biometric data can also be compared to read card data. Correlation of biometric data and card data can result in customer authorization.

The user interface 116 may further include a deposit acceptance area, which is an area through which deposits such as checks or currency may be deposited into the body 118 in the ATM 100. In an example embodiment, the deposit acceptance area serves as a transaction area of the machine and is positioned and extends within a recessed pocket of the body 118. It should be understood that although the example embodiment of the ATM 100 includes a deposit accepting device for checks and paper currency, other or different types of transaction function devices may be included in automated banking machines. These may include, for example, ticket accepting devices, stamp accepting devices, card dispensing devices, money order dispensing devices and other types of devices which are operative to carry out transaction functions.

In the non-limiting embodiment shown, the receptacle 102 and the exit device 110 may be offset relative to one another. That is, the receptacle 102 may be positioned horizontally apart, e.g., along the x-direction, as well as vertically apart, e.g., along the y-direction. Such an arrangement permits a transaction card to be deposited in the receptacle 102, scanned in a horizontal direction by the card reader 106, and then dropped into the exit device 110, which is positioned below the receptacle 102.

Figure 3A:
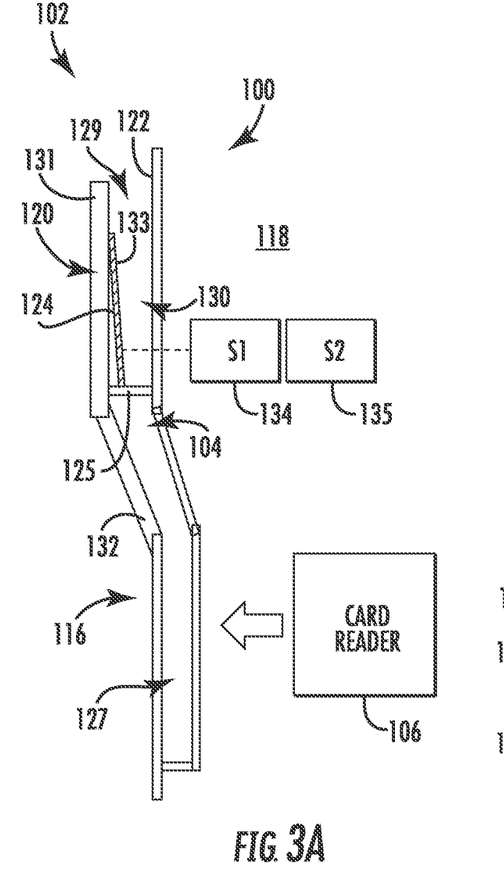
FIGS. 3A-3B are side views of the card receptacle of FIG. 1, in accordance with embodiments of the present disclosure.
Figure 3B:
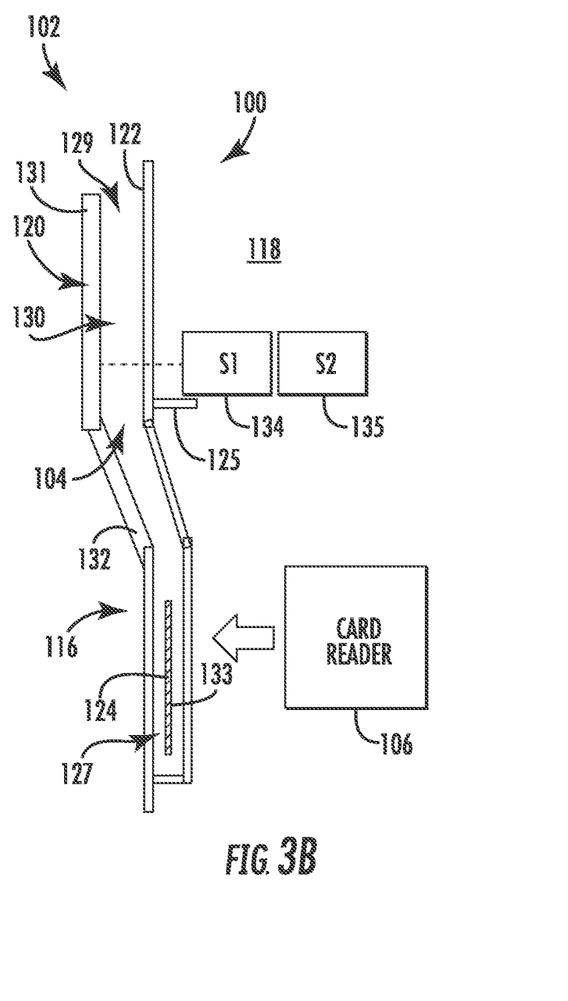
Figure 4:
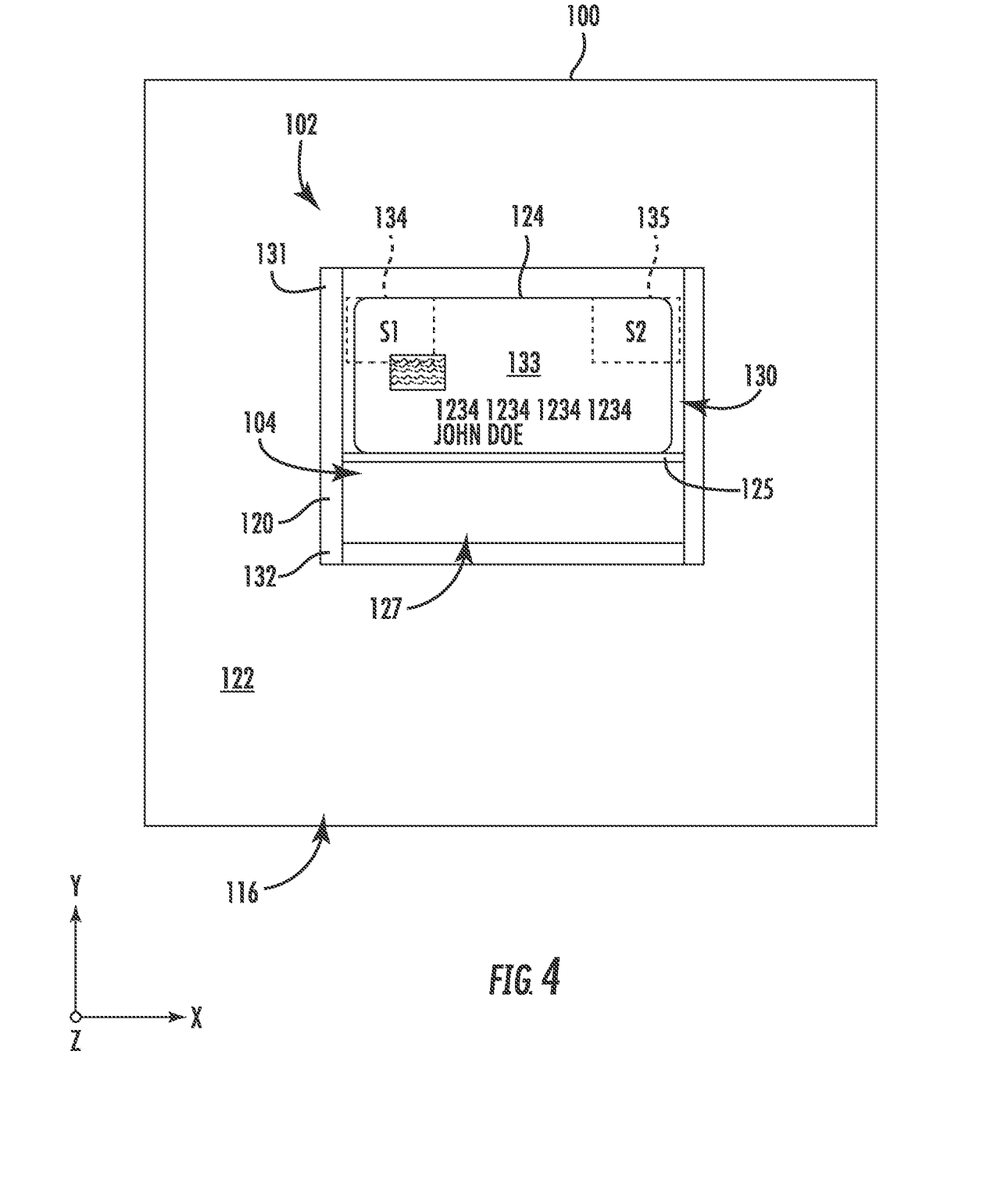
FIG. 4 is a front view of the card receptacle of FIG. 1, in accordance with embodiments of the present disclosure.

Turning now to FIGS. 3A, 3B, and 4, the receptacle 102 of the ATM 100 according to embodiments of the present disclosure will be described in greater detail. As shown, the receptacle 102 may include a wall 120 extending adjacent a main surface 122 of the user interface 116. In some embodiments, the wall 120 may be transparent or translucent so a user may view a transaction card 124 (e.g., debit card) as the transaction card 124 enters the ATM 100. As shown, the wall 120 generally extends across the entrance opening 104 of the user interface 116. Although non-limiting, the wall 120 may extend substantially parallel to the main surface 122.

The receptacle 102 may further include a support 125 extending between the main surface 122 and the wall 120, the support 125 covering the entrance opening 104 through the main surface 122. Although non-limiting, the support 125 may be a platform moveable from a closed configuration, shown in FIG. 3A, to an open configuration, shown in FIG. 3B. The support 125 may extend into the body 118 of the ATM 100, or may pivot/swing downward. In either embodiment, movement of the support 125 permits the transaction card 124 to fall into an internal cavity 127, which may be positioned below the support 125. Once the transaction card 124 is positioned within the internal cavity 127, the transaction card 124 may be brought to the card reader 106 for processing.

In example embodiments, the support 125, the wall 120 and the main surface 122 of the user interface 116 define a cavity 130 operable to initially receive the transaction card 124 from a user. As shown, the transaction card 124 may be received through an upper opening 129 of the card receptacle, wherein a main surface 133 of the transaction card 124 is substantially parallel with the main surface 122 of the user interface 116. As shown, the cavity 130 is positioned external to the main surface 122, and may be open at the top. In other embodiments, the cavity 130 may be covered by a flap or movable lid (not shown). The wall 120 may include an upper end 131 and a lower end 132, wherein the lower end 132 is connected with the main surface 122 of the user interface 116. As such, the wall 120 may guide the transaction card into the internal cavity 127. It will be appreciated that the wall 120 and the cavity 130 may be shaped and/or sized differently in other embodiments.

The ATM 100 may further include one or more sensors 134, 135 operable to provide positional feedback of the transaction card 124 in the cavity 130. More specifically, the first and second sensors 134, 135 may communicate with the controller 115 (FIG. 1) of the ATM to determine an orientation of the transaction card 124 within the cavity 130, and then compare the orientation of the transaction card 124 with a pre-determined acceptable transaction card orientation. The support 125 of receptacle 102 may then be opened when the orientation of the transaction card 124 substantially equals the acceptable transaction card orientation.

As better shown in FIG. 4, the first and second sensors 134, 135 may be spaced horizontally apart, e.g., along the x-direction. In some embodiments, both the first and second sensors 134, 135 must detect the transaction card 124 before the support 125 is be opened. In the event the transaction card 124 is oriented incorrectly in the cavity 130, for example, vertically as opposed to horizontally (e.g., along the x-direction), one or more of the first and second sensors 134, 135 will not detect the transaction card 124. Once the first and second sensors 134, 135 detect the presence of the transaction card 124, a signal may be sent from the controller 115 to open the support 125, thus causing the transaction card 124 to drop into the internal cavity 127. In some embodiments, the first and second sensors 134, 135 may also be able to detect/recognize one or more indicia, such as such as a card number, or a magnetic strip of the transaction card 124 to determine whether the transaction card 124 is oriented as intended for subsequent processing.

It will be appreciated that other embodiments may include a smaller or larger number of position sensors placed at the same or different locations relative to the receptacle 102. The first and second sensors 134, 135 may each be optical, capacitive, resistance, pressure, and other types of sensors. In some embodiment, the first and second sensors 134, 135 are infrared optical sensors. Regardless of the type of sensor, first and second sensors 134, 135 identify when the transaction card 124 is present at a location of the respective sensor and provides signals to the controller 115 indicative thereof.

Figure 5A:
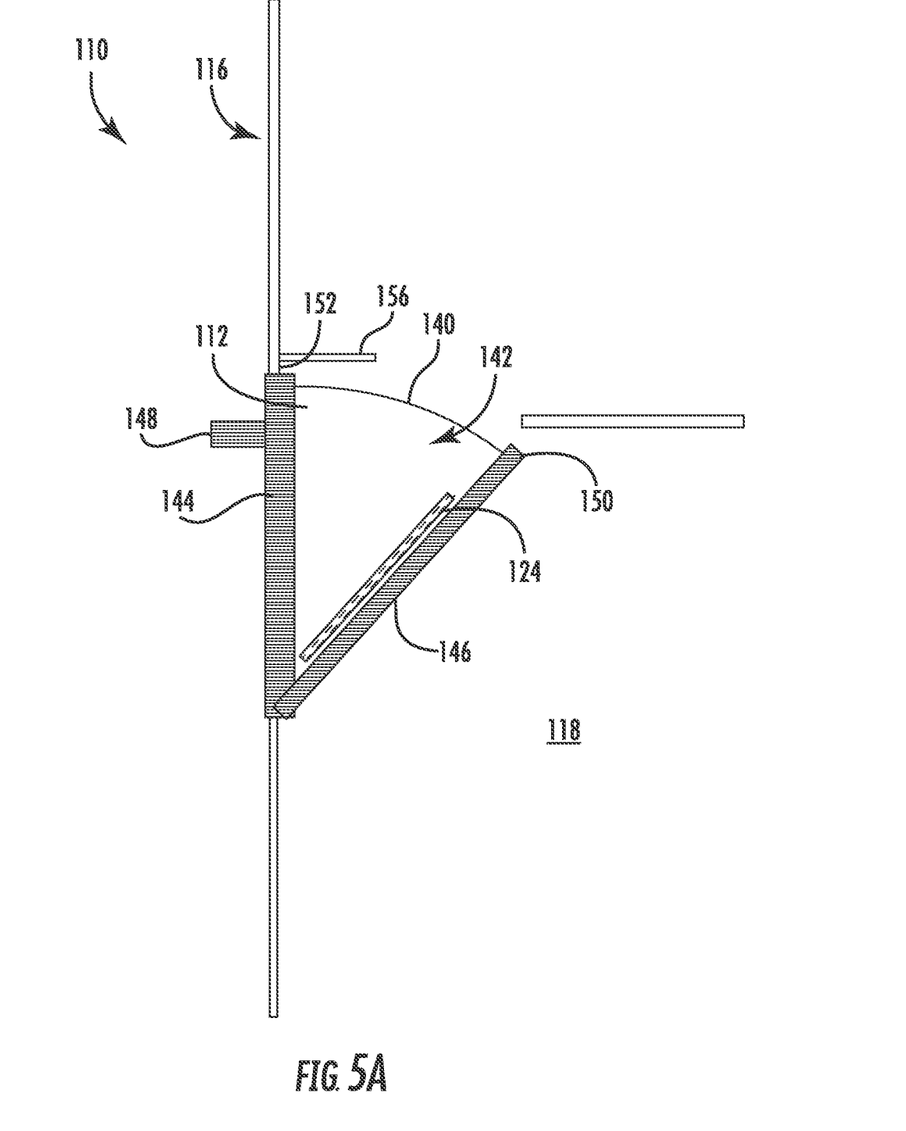
FIGS. 5A-5B are side views of the exit device of FIG. 1, in accordance with embodiments of the present disclosure.
Figure 5B:
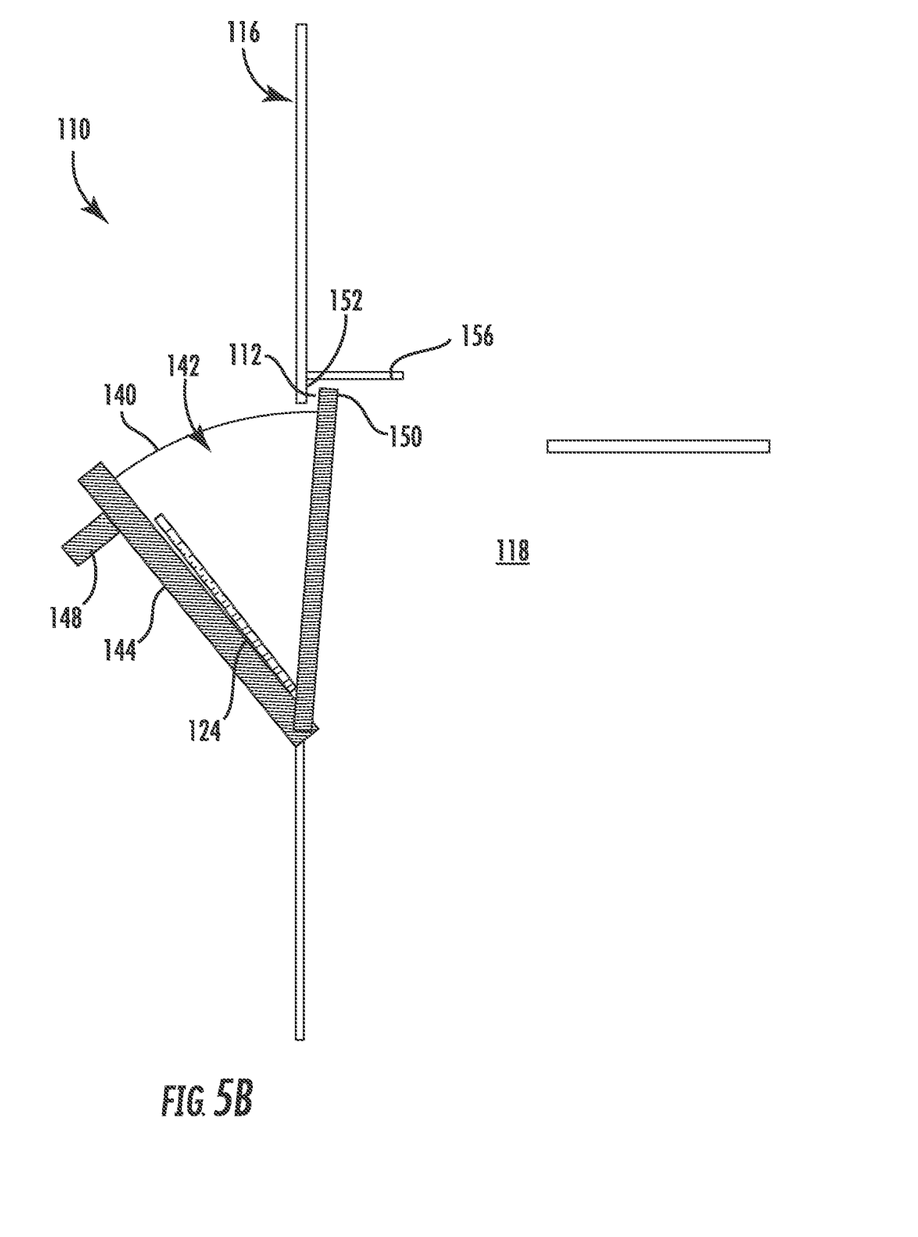

Turning now to FIGS. 5A-5B, the exit device 110 according to embodiments of the present disclosure will be described in greater detail. As shown, the exit device 110 may include a container 140 for receiving the transaction card 124 therein. The container 140 may include an open cavity 142 defined by a door 144 and an exit device wall 146. The transaction card 124 may be deposited into the container 140 after being processed by the card reader 106 (FIG. 1). In some embodiments, the door 144 and the exit device wall 146 may be fixed such that an angle formed therebetween remains constant. In other embodiments, the door 144 and/or the exit device wall 146 may pivot with respect to one another.

As shown, the door 144 is biasable between a first position (FIG. 5A) to a second position (FIG. 5B). In the first position of the exit device 110, the door 144 substantially covers the exit opening 112. In the second position of the exit device 110, the door 144 permits access to the container 140 through the exit opening 112. A user may open the door 144 using, for example, a handle 148, and remove the transaction card 124 from the container 140 after the transaction has completed. Although non-limiting, a free end 150 of the exit device wall 146 may engage an interior abutment surface 152 of the user interface 116 to limit rotation of the exit device 110. Furthermore, when the exit device wall 146 is engaged with the interior abutment surface 152, the exit device 110 provides a physical barrier to prevent access to an interior of the body 118 of the ATM 100. In some embodiments, one or more security components 156 may be strategically placed within the body 118 to further prevent access to an interior of the body 118 of the ATM 100.

Figure 6A:
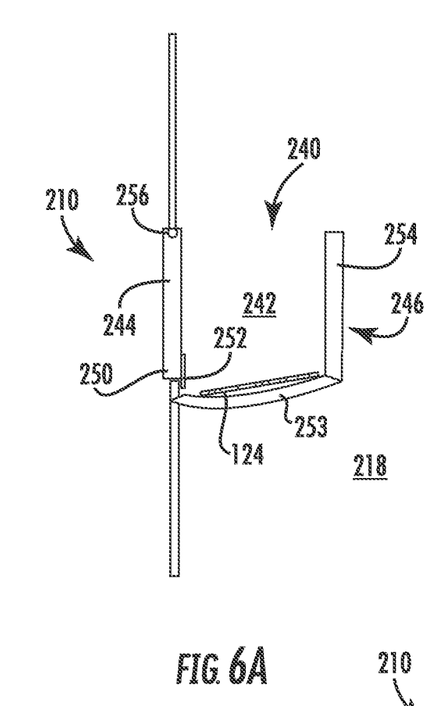
FIGS. 6A-6B are side views of another exit device, in accordance with embodiments of the present disclosure.
Figure 6B:
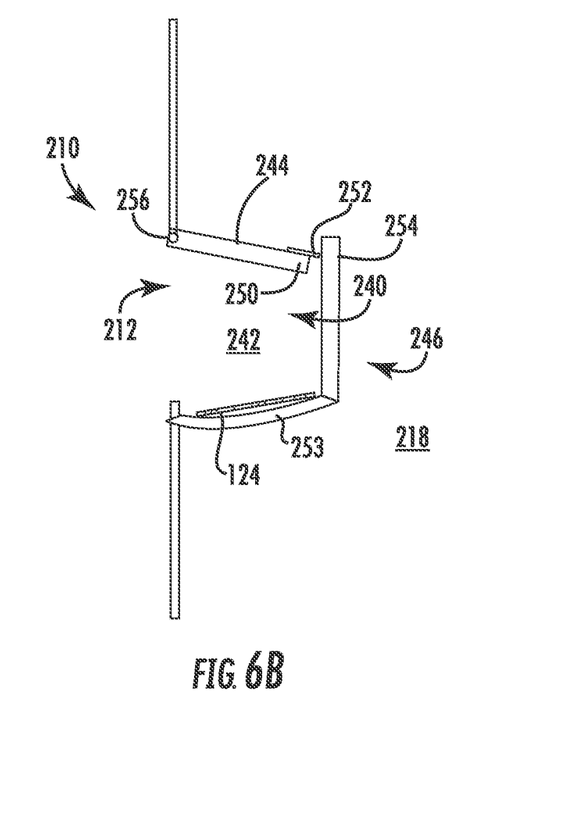

Turning now to FIGS. 6A-6B, another exit device 210 according to embodiments of the present disclosure will be described in greater detail. As shown, the exit device 210 may include a container 240 for receiving the transaction card 124 therein. The container 240 may include an open cavity 242 defined by a door 244 and an exit device wall 246. In some embodiments, the exit device wall 246 may include a bottom section 253 and a sidewall section 254 extending from the bottom section 253. The transaction card 124 may be deposited into the container 240 after being processed by the card reader 106 (FIG. 1).

As shown, the door 244 is biasable between a first position (FIG. 6A) and a second position (FIG. 6B). In some embodiments, the door 244 may swing about a pivot point 256. In the first position of the exit device 210, the door 244 substantially covers the exit opening 212. In the second position of the exit device 210, the door 244 permits access to the container 240. A user may open the door 244, for example, by pushing the door 244 towards the interior 218 of the ATM 100 to access the transaction card 124 from the container 240. Although non-limiting, a free end 250 of the door 244 may include an interior abutment component 252 to limit outward rotation of the door 244.

Figure 7:
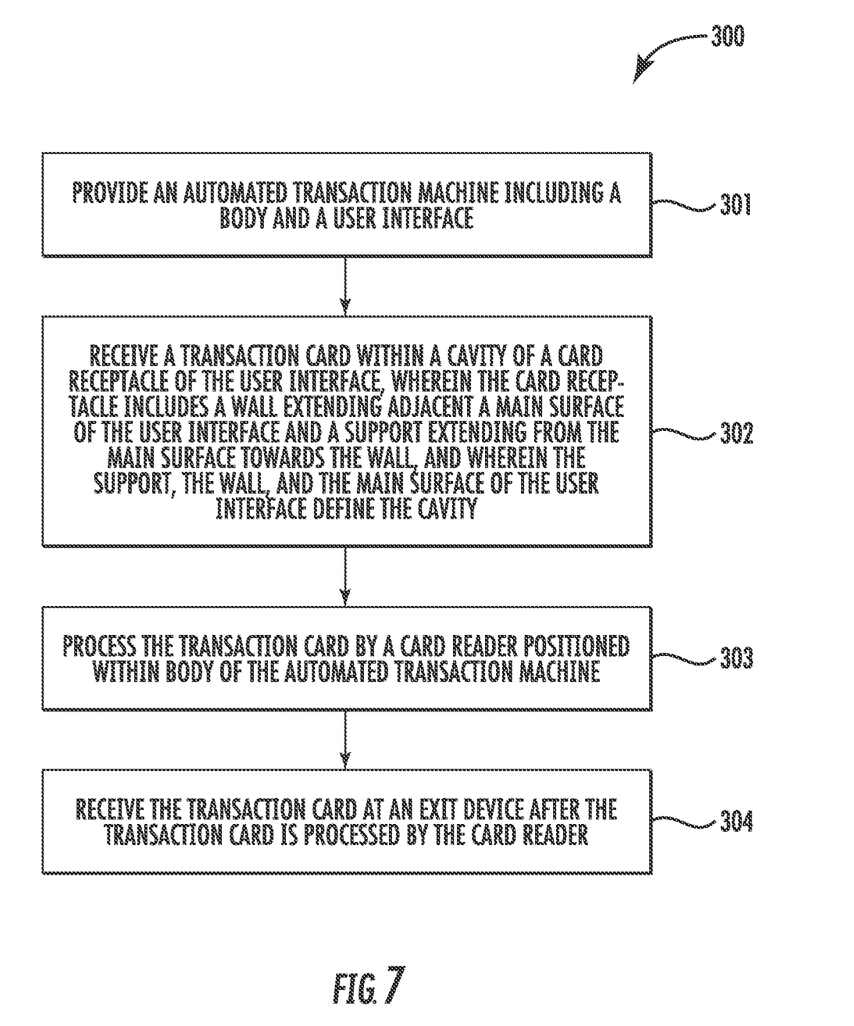
FIG. 7 illustrates a flowchart for performing methods in accordance with embodiments of the present disclosure.

Turning now to FIG. 7, a method 300 according to embodiments of the present disclosure will be described. At block 301, the method 300 may include providing an automated transaction machine including a body and a user interface. In some embodiments, the automated transaction machine is a point of sale device or an automatic teller machine.

At block 302, the method 300 may include receiving a transaction card within a cavity of a card receptacle of the user interface. In some embodiments, the card receptacle includes a wall extending adjacent a main surface of the user interface. The card receptacle may further include a support extending from the main surface towards the wall, wherein the support, the wall, and the main surface of the user interface define the cavity. In some embodiments, the transaction card is received through an upper opening of the card receptacle, wherein a main surface of the transaction card is substantially parallel with the main surface of the user interface.

In some embodiments, the method 300 further includes biasing the support of the card receptacle to cause the transaction card to pass through an entrance opening in the main surface of the user interface. The transaction card may then be delivered to an internal cavity, wherein the internal cavity is connected with the entrance opening. In some embodiments, the support is a platform moveable between a closed configuration and an open configuration.

In some embodiments, the method 300 further includes determining an orientation of the transaction card within the cavity of the card receptacle, and comparing the orientation of the transaction card with a pre-determined acceptable transaction card orientation. The support of the card receptacle may then be opened when the orientation of the transaction card substantially equals the acceptable transaction card orientation.

At block 303, the method 300 may include processing the transaction card by a card reader positioned within the body of the automated transaction machine.

At block 304, the method 300 may include receiving the transaction card at an exit device after the transaction card is processed by the card reader. In some embodiments, the exit device includes a container for collecting the transaction card, and a door positioned adjacent the container. The door may be biasable between a first position and a second position, wherein in the first position the door substantially covers an exit opening through the main surface of the user interface, and wherein in the second position the door permits access to the container through the exit opening.

In summation, embodiments described herein advantageously provide a system in which a transaction card is loosely dropped or placed into an openable card receptacle. Card skimmers work when a transaction card is forcibly slid through the skimmer. Because the card receptacle and exit device of the present disclosure do not force the transaction therethrough, the possibility of the transaction card being read by a skimmer is reduced.

Disclosed embodiments herein include systems and methods for processing a transaction card, such as the transaction card 124 described above. The term "transaction card," as used herein, refers to any physical card product that is configured to provide information, such as financial information (e.g., card numbers, account numbers, account balance, etc.), quasi-financial information (e.g., rewards balance, discount information, etc.), and/or individual-identifying information (e.g., name, address, etc.), when the card is read by a card reader. Examples of transaction cards include credit cards, debit cards, gift cards, rewards cards, frequent flyer cards, merchant-specific cards, discount cards, etc., but are not limited thereto. The term "transaction card" may include an identification card such as a passport card, a driver's license, an entry point access card, or the like. The physical properties of the transaction card (e.g., size, flexibility, location of various components included in the card) may meet the various international standards, including, e.g., ISO/IEC 7810, ISO/IEC 7811, ISO/IEC 7812, ISO/IEC 7813, ISO/IEC 7816, ISO 8583, ISO/IEC 4909, and ISO/IEC 14443. For example, a transaction card may have a dimension of 85.60 mm (width) by 53.98 mm (height) by 0.76 mm (thickness), as specified in ISO/IEC 7810.

In some embodiments, the transaction card 124 may further include a transaction component disposed on or in a transaction card frame. As used herein, a "transaction component" may be one or more devices and/or elements configured to receive, store, process, provide, transfer, send, delete, and/or generate information. For example, transaction component may be a microchip (e.g., an Europay, MasterCard, and Visa (EMV) chip), a communication device (e.g., Near Field Communication (NFC) antenna, Bluetooth® device, WiFi device), a magnetic stripe, a barcode, Quick Response (QR) code, or a combination thereof.

The foregoing discussion has been presented for purposes of illustration and description and is not intended to limit the disclosure to the form or forms disclosed herein. For example, various features of the disclosure may be grouped together in one or more aspects, embodiments, or configurations for the purpose of streamlining the disclosure. However, it should be understood that various features of the certain aspects, embodiments, or configurations of the disclosure may be combined in alternate aspects, embodiments, or configurations. Moreover, the following claims are hereby incorporated into this Detailed Description by this reference, with each claim standing on its own as a separate embodiment of the present disclosure.

As used herein, an element or step recited in the singular and proceeded with the word "a" or "an" should be understood as not excluding plural elements or steps, unless such exclusion is explicitly recited. Furthermore, references to "one embodiment" of the present disclosure are not intended to be interpreted as excluding the existence of additional embodiments that also incorporate the recited features.

The use of "including," "comprising," or "having" and variations thereof herein is meant to encompass the items listed thereafter and equivalents thereof as well as additional items. Accordingly, the terms "including," "comprising," or "having" and variations thereof are open-ended expressions and can be used interchangeably herein.

The phrases "at least one", "one or more", and "and/or", as used herein, are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

All directional references (e.g., proximal, distal, upper, lower, upward, downward, left, right, lateral, longitudinal, front, back, top, bottom, above, below, vertical, horizontal, radial, axial, clockwise, and counterclockwise) are only used for identification purposes to aid the reader's understanding of the present disclosure, and do not create limitations, particularly as to the position, orientation, or use of this disclosure. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other.

Furthermore, identification references (e.g., primary, secondary, first, second, third, fourth, etc.) are not intended to connote importance or priority, but are used to distinguish one feature from another. The drawings are for purposes of illustration only and the dimensions, positions, order and relative sizes reflected in the drawings attached hereto may vary.

Furthermore, the terms "substantial" or "substantially," as well as the terms "approximate" or "approximately," can be used interchangeably in some embodiments, and can be described using any relative measures acceptable by one of ordinary skill in the art. For example, these terms can serve as a comparison to a reference parameter, to indicate a deviation capable of providing the intended function. Although non-limiting, the deviation from the reference parameter can be, for example, in an amount of less than 1%, less than 3%, less than 5%, less than 10%, less than 15%, less than 20%, and so on.

Still furthermore, although the illustrative method 300 is described above as a series of acts or events, the present disclosure is not limited by the illustrated ordering of such acts or events unless specifically stated. For example, some acts may occur in different orders and/or concurrently with other acts or events apart from those illustrated and/or described herein, in accordance with the disclosure. In addition, not all illustrated acts or events may be required to implement a methodology in accordance with the present disclosure. Furthermore, the method 300 may be implemented in association with the formation and/or processing of structures illustrated and described herein as well as in association with other structures not illustrated.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Furthermore, the present disclosure has been described herein in the context of a particular implementation in a particular environment for a particular purpose. Those of ordinary skill in the art will recognize the usefulness is not limited thereto and the present disclosure may be beneficially implemented in any number of environments for any number of purposes. Thus, the claims set forth below are to be construed in view of the full breadth and spirit of the present disclosure as described herein.

What is claimed is:

1. An automated transaction machine (ATM), comprising:
   a card receptacle of a user interface, the card receptacle comprising:
   a wall adjacent a main surface of the user interface; and
   a support extending between the main surface and the wall, wherein the support, the wall, and the main surface of the user interface define a cavity operable to receive a transaction card, wherein the support is biasable between a first position and a second position, wherein in the first position the support substantially covers an entrance opening into an internal cavity, and wherein in the second position the support permits passage of the transaction card into the internal cavity; and
   an exit device of the user interface, the exit device comprising a container for receiving the transaction card.

2. The ATM of claim 1, the exit device further comprising a door positioned adjacent the container, the door biasable between a first door position and a second door position, wherein in the first door position the door substantially covers an exit opening through the main surface of the user interface, and wherein in the second door position the door permits access to the container through the exit opening.

3. The ATM of claim 2, the exit device comprising an open cavity defined by the door and an exit device wall, wherein the door and the exit device wall are joined together.

4. The ATM of claim 1, wherein the cavity is positioned external to the main surface of the user interface.

5. The ATM of claim 1, further comprising a body, wherein the user interface extends along a portion of a body.

6. The ATM of claim 5, further comprising a card reader within the body.

7. The ATM of claim 6, further comprising a card delivery device for delivering the transaction card from the card receptacle to the card reader.

8. The ATM of claim 1, wherein the wall includes an upper end and a lower end, and wherein the lower end is connected with the main surface of the user interface.

9. The ATM of claim 1, further comprising an internal cavity connected with the entrance opening, wherein the internal cavity is operable to receive the transaction card from the internal cavity.

10. The ATM of claim 1, further comprising a sensor proximate the card receptacle, the sensor operable to provide positional feedback of the transaction card in the cavity.

11. A system comprising:
a card receptacle of a user interface, the card receptacle comprising a cavity operable to receive a transaction card, the card receptacle comprising a support extending between a main surface of the user interface and a wall, wherein the support, the wall, and the main surface of the user interface define a cavity operable to receive a transaction card, wherein the support is biasable between a first position and a second position, wherein in the first position the support substantially covers an entrance opening into an internal cavity, and wherein in the second position the support permits passage of the transaction card into the internal cavity;
a card reader proximate the card receptacle; and
an exit device operable to receive the transaction card after the transaction card is processed by the card reader, the exit device comprising:
a container for receiving the transaction card; and
a door positioned adjacent the container, the door biasable between a first door position and a second door position, wherein in the first door position the door substantially covers an exit opening through the main surface of the user interface, and wherein in the second door position the door permits access to the container through the exit opening.

12. The system of claim 11, wherein the cavity is positioned external to the main surface of the user interface.

13. The system of claim 11, further comprising a body, wherein the user interface extends along a portion of the body, and wherein the card reader is disposed within the body.

14. The system of claim 11, wherein the wall includes an upper end and a lower end, and wherein the lower end is connected with the main surface of the user interface.

15. The system of claim 11, further comprising a sensor proximate the card receptacle, the sensor operable to provide positional feedback of the transaction card in the cavity.

16. A method, comprising:
providing an automated transaction machine including a body and a user interface;
receiving a transaction card within a cavity of a card receptacle of the user interface, the card receptacle comprising a support positioned over the cavity;
processing the transaction card by a card reader positioned within the body to determine an orientation of the transaction card;
comparing, using a controller, the orientation of the transaction card with a pre-determined transaction card orientation; and
opening the support in response to the orientation of the transaction card equaling the pre-determined transaction card orientation to cause the transaction card to be received at an exit device, the exit device comprising:
a container for collecting the transaction card; and
a door positioned adjacent the container, the door biasable to permit access to the container.

17. The method of claim 16, further comprising:
biasing the support of the card receptacle in response to a signal provided to the controller to cause the transaction card to pass through an entrance opening in a main surface of the user interface; and
delivering the transaction card to an internal cavity, the internal cavity connected with the entrance opening.

18. The method of claim 16, further comprising:
determining, in response to feedback from one or more sensors, the orientation of the transaction card within the cavity of the card receptacle;
comparing the orientation of the transaction card with the pre-determined transaction card orientation; and
biasing the support of the card receptacle from a closed position to an open position when the orientation of the transaction card substantially equals the pre-determined transaction card orientation.

19. The method of claim 16, further comprising receiving the transaction card through an upper opening of the card receptacle, wherein a main surface of the transaction card is substantially parallel with the main surface of the user interface.

* * * * *